United States Patent

Terada et al.

[11] Patent Number: 5,854,427
[45] Date of Patent: Dec. 29, 1998

[54] ANGULAR VELOCITY SENSOR

[75] Inventors: Jiro Terada, Hirakata; Hiroshi Senda, Neyagawa; Masami Tamura, Uji; Masaharu Ushihara, Hirakata; Masakazu Hatanaka, Hannan, all of Japan

[73] Assignee: Matsushita Electric Industrial Co., Ltd., Osaka, Japan

[21] Appl. No.: 836,482

[22] PCT Filed: Sep. 6, 1996

[86] PCT No.: PCT/JP96/02538

§ 371 Date: May 7, 1997

§ 102(e) Date: May 7, 1997

[87] PCT Pub. No.: WO97/09585

PCT Pub. Date: Mar. 13, 1997

[30] Foreign Application Priority Data

Sep. 8, 1995 [JP] Japan ..................................... 7-230885
Dec. 19, 1995 [JP] Japan ..................................... 7-330002

[51] Int. Cl.⁶ ................................................... G01P 9/04
[52] U.S. Cl. ...................... 73/504.16; 310/329; 310/370
[58] Field of Search ........................... 73/504.16, 504.12, 73/504.15; 310/370, 329

[56] References Cited

U.S. PATENT DOCUMENTS 5,430,342  7/1995  Watson ................................... 310/316
5,635,786  6/1997  Fujimoto et al. ..................... 73/504.12

FOREIGN PATENT DOCUMENTS 62-217115  9/1987  Japan .
63-58111   3/1988  Japan .
8-94362    4/1996  Japan .
8-128833   5/1996  Japan .
8-201066   8/1996  Japan .

*Primary Examiner*—John E. Chapman
*Attorney, Agent, or Firm*—McDermott, Will & Emery

[57] ABSTRACT

The present invention is related to an angular velocity sensor, and intends to improve the detection characteristic through a precise measuring of an angular velocity signal. For this objective, the invented angular velocity sensor comprises U-shape first and second piezoelectric elements (4),(5) bonded together sandwiching a detection electrode (6), wherein in at least one of the tuning fork arms(4a),(5a) the first and second piezoelectric elements(4),(5) are polarized in a direction of thickness along which the piezoelectric elements are bonded together. Driving electrodes(7),(12) and (8),(11) provided in diagonal arrangement on the tuning fork arm are supplied with driving signals inverse-phased to each other. In such a structure, the driving signals cancel to each other at the vicinity of detection electrode; as a result, the driving signals never mix with a detection signal to be detected by the detection electrode(6). Thus, the capability of detecting an angular velocity signal is improved.

10 Claims, 8 Drawing Sheets

ANGULAR VELOCITY SENSOR

TECHNICAL FIELD

The present invention relates to a vibration type angular velocity sensor for use in the attitude control, navigation, etc. of mobile items such as aircrafts, automobiles, robots, ships, or vehicles, or an angular velocity sensor for use in the anti-blurring gear, remote controller etc. of still cameras, or video cameras.

BACKGROUND ART

An angular velocity sensor of the above category comprises a U-shape vibration member, on which piezoelectric elements are attached each forming a driving section and a detecting section. The tuning fork arm of piezoelectric elements is driven by a driving power source supplied to an electrode of a piezoelectric elements of said vibration member, and the Coriolis force generated at the detecting section is detected as an angular velocity signal to be taken out of the piezoelectric element of the detecting section.

In the above described structure, however, a signal taken out of the detection electrode contains, besides the angular velocity signal, unnecessary signals induced by the driving signal. Therefore, it needs a circuit to separate the unnecessary signal. A problem is that the signals other than angular velocity signal are not thoroughly separated by the circuit; part of which remains as noise, making it difficult to improve the detection characteristics.

BRIEF SUMMARY OF THE INVENTION

The present invention is intended to eliminate the influence due to noise from driving signal, thereby improving the detection characteristics of angular velocity signal.

In order to implement the objective, an angular velocity sensor according to the present invention comprises U-shape first and second piezoelectric elements bonded together sandwiching a detection electrode, said first piezoelectric element having in at least one of the tuning fork arms a first and a second driving electrodes on a surface opposite to the detection electrode and said second piezoelectric element having in a tuning fork arm corresponding to the tuning fork arm on which said first and second driving electrodes are disposed a third and a fourth driving electrodes on a surface opposite to the detection electrode; wherein, among said first through fourth driving electrodes, the first and the third driving electrodes disposed in diagonal arrangement across the detection electrode are coupled with a first driving power source while the second and the fourth driving electrodes disposed on another diagonal line across the detection electrode are coupled with a second driving power source which supplies a signal whose phase is inverse to that of said first driving power source, and at least one of the tuning fork arms of said U-shape first and second piezoelectric elements is polarized in a direction of thickness along which the first and the second piezoelectric elements are bonded together.

Under the above described constitution, the first and the third driving electrodes disposed in a diagonal arrangement in a tuning fork arm receive a driving signal from the first driving power source, while the second and the fourth driving electrodes disposed on another diagonal line in the tuning fork arm receive a driving signal from the second driving power source the phase of which signal being inverse to that of the first driving power source. The signals for driving the tuning fork arm are thus applied across a detection electrode, which means that the driving signals cancel to each other on the detection electrode, and are never mixed in a detection signal. As a result, the capability of detecting the angular velocity signal is improved.

Further, an angular velocity sensor according to the present invention comprises U-shape first and second piezoelectric elements bonded together sandwiching an intermediate electrode, said first piezoelectric element having in at least one of the tuning fork arms a first and a second driving electrodes and a first detection electrode on a surface opposite to the intermediate electrode and said second piezoelectric element having in a tuning fork arm corresponding to the tuning fork arm on which said first and second driving electrodes and first detection electrode are disposed a third and a fourth driving electrodes and a second detection electrode on a surface opposite to the intermediate electrode; wherein, among said first, second, third and fourth driving electrodes, the first and the third driving electrodes disposed in diagonal arrangement across the intermediate electrode are coupled with a first driving power source while the second and the fourth driving electrodes disposed on another diagonal line across the intermediate electrode are coupled with a second driving power source which supplies a signal whose phase is inverse to that of said first driving power source, and at least one of the tuning fork arms of said U-shape first and second piezoelectric elements is polarized in a direction of thickness along which the first and the second piezoelectric elements are bonded together.

Under the above described constitution, the influence due to noise from a driving signal is eliminated and the characteristics of detecting the angular velocity signal are raised.

DETAILED DESCRIPTION OF THE INVENTION

Figure 1:
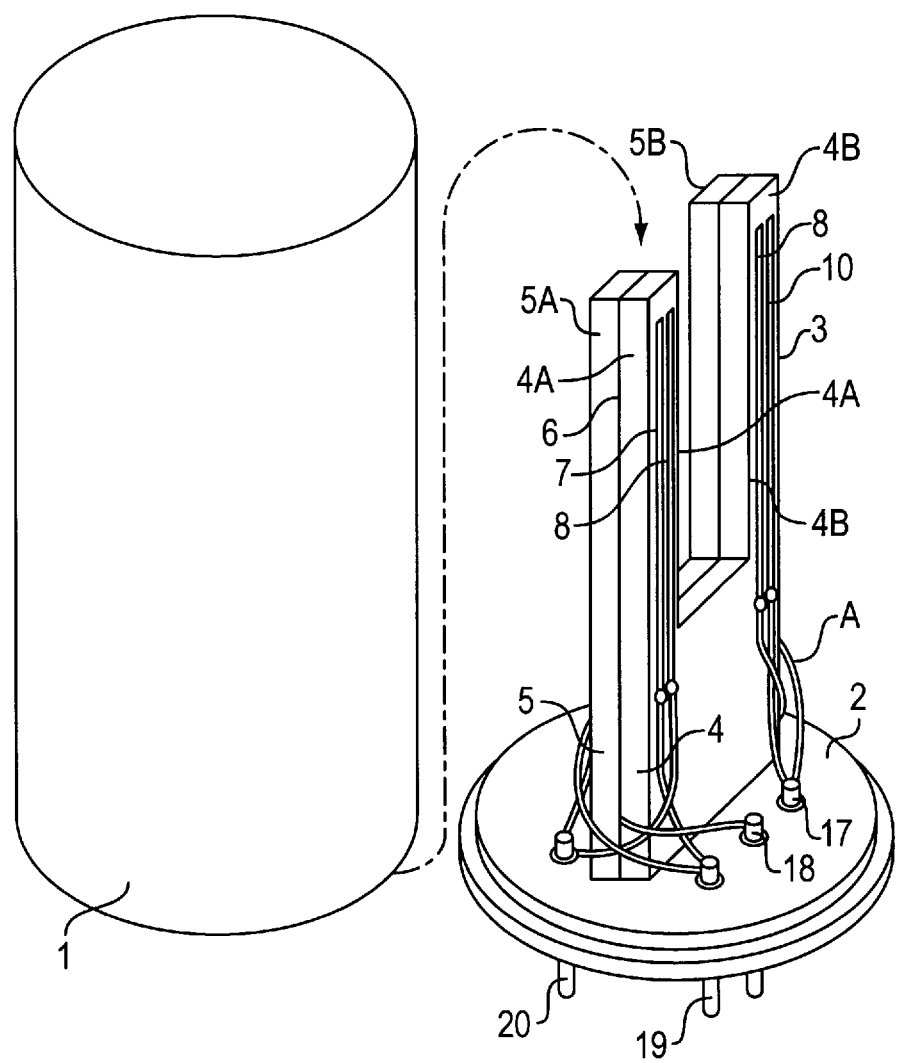
FIG. 1 is a perspective view showing an assembled angular velocity sensor according to a first embodiment of the present invention.
Figure 2:
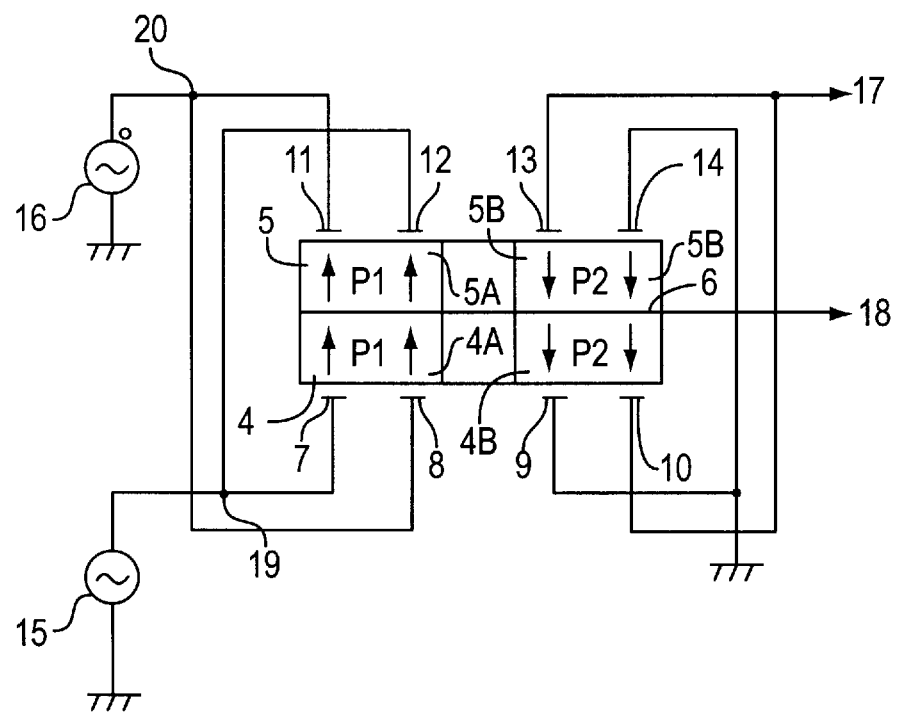
FIG. 2 is a conceptual chart showing the key portion of the angular velocity sensor of FIG. 1.

In the following, an angular velocity sensor according to an embodiment of the present invention is described referring to drawings. In FIG. 1, numeral 1 denotes an iron cap with the bottom open, nickel plated on the surface, the bottom opening is fitted with a disk base 2 to form a sealed space within cap 1 housing an assembled angular velocity sensor. A detection element 3 is disposed within the sealed space without having contact with the inner surface of cap 1, the detection element being fixed on the base 2 with glue. Said detection element 3 is comprised of U-shape first and second piezoelectric elements 4,5, bonded together with a U-shape Ag-Pd detection electrode 6 in between, sintered to form a single body, as shown in FIG. 1. On the surface of tuning fork arms 4a,4b and 5a,5b of said first and second piezoelectric elements 4,5, oblong shaped Ag-Pd electrodes 7,8,9,10,11,12,13 and 14 are provided respectively by printing/sintering, as shown in FIG. 1 and FIG. 2. Among these, 7,8,11 and 12 being driving electrodes, 9,10,13 and 14 being monitor electrodes. As FIG. 2 shows, in a tuning fork arm 4a,5a of the bonded member, driving electrodes 7,12 disposed on a diagonal across the detection electrode 6 are coupled with a first driving power source 15, while driving electrodes 8,11 disposed on another diagonal line crossing said diagonal are coupled with a second driving power source 16. Each of the first and second driving power sources 15, 16 supplies AC signal (tuning fork resonance frequency) to the pair of driving electrodes 7,12 and the other pair of driving electrodes 8,11, respectively, to make the tuning fork resonate. The signals supplied from the first and the second driving power sources 15,16 are inverse-phased to each other.

In a tuning fork arm 4b,5b constituting the monitor side, monitor electrodes 9,14 disposed on a diagonal are grounded, while monitor electrodes 10,13 disposed on another diagonal crossing said diagonal line are connected to a monitor detection terminal 17. Detection electrode 6 is connected to detection terminal 18. These electrical connections are illustrated in FIG. 1, where, 19,20 are power supply terminals connected by lead wires A. The lead wire A between detection terminal 18 and detection electrode 6 is connected with the detection electrode 6 at a location lower than the tuning fork arms 4a,4b,5a,5b.

With the above described constitution, the tuning fork arm 4a,5a is polarized for 3 kV/mm field intensity in the direction of thickness, while the tuning fork arm 4b,5b is polarized opposite in the direction of thickness for 3 kV/mm field intensity, as shown in FIG. 2. Directions of the polarization are indicated with the symbols P1 and P2, respectively.

When driving electrodes 7,8,11 and 12 are supplied with signals from the first and second driving power sources 15,16, the tuning fork arm 4a,5a vibrates sidewise to the polarization direction P1, and the tuning fork arm 4b,5b resonates to make sidewise vibration to the polarization direction P2.

Explaining more in detail, suppose the inner driving electrodes 8,12 of the tuning fork arm 4a,5a are supplied with signals of inverse phase, the driving electrode 8 is provided with a negative electric field while the driving electrode 12 is provided with a positive electric field; this means that both of the tuning fork arms 4a and 5a are provided with a negative electric field towards the bottom in FIG. 2, viz. in the opposite side to the polarization direction P1, and the inner side of tuning fork arm 4a,5a shrinks. In the outer side of tuning fork arm 4a,5a, an electric field of the same direction as the polarization direction P1 is provided from the driving electrodes 7,11 causing an elongation. As the result, the tuning fork arm 4a,5a bends inward, viz. tilts towards the tuning fork arm 4b,5b. When, the tuning fork arm 4b,5b corresponds to the move of tuning fork arm 4a,5a bending towards the tuning fork arm 4a,5a. At the next moment when the phase of signals supplied from the first and the second driving power sources 15,16 is reversed, the tuning fork arm 4a,5a and tuning fork arm 4b,5b are respectively bent outward. These actions are alternated and the U-shape vibration member makes a resonating vibration.

When an angular velocity is applied to the U-shape vibration member being in resonance vibration the tuning fork arm 4a,5a and the tuning fork arm 4b,5b are bent by the Coriolis force in the direction of thickness, and the extent of bend is picked up by detection electrode 6 and detection terminal 18. For example, referring to FIG. 2, when the tuning fork arm 4a,5a is bent in a direction where the lower surface of tuning fork arm 4a elongates while the upper surface of tuning fork arm 5a shrinks, the driving electrodes 7,8 are elongated in a direction perpendicular to the polarization direction, to generate a positive electric charge; the driving electrodes 11,12 shrink in a direction perpendicular to the polarization direction, to generate a positive electric charge as well. When, a negative electric charge is generated in a portion of detection electrode 6 sandwiched by tuning fork arms 4a,5a, a portion of detection electrode 6 sandwiched by tuning fork arms 4b,5b also have a negative electric charge; these electric charges are taken out from detection terminal 18. When an angular velocity of opposite direction is applied to, the driving electrodes 11,12 of tuning fork arm 4a,5a are elongated, while the driving electrodes 7,8 shrink; a positive electric charge is delivered from detection terminal 18 by the same principle as described above.

Signals for driving tuning fork arms 4a,5a,4b,5b are supplied to the tuning fork arms 4a,5a,4b,5b. However, their signal components are cancelled by each other and the driving signal is never mixed in a detection signal detectable by detection electrode 6.

Figure 3:
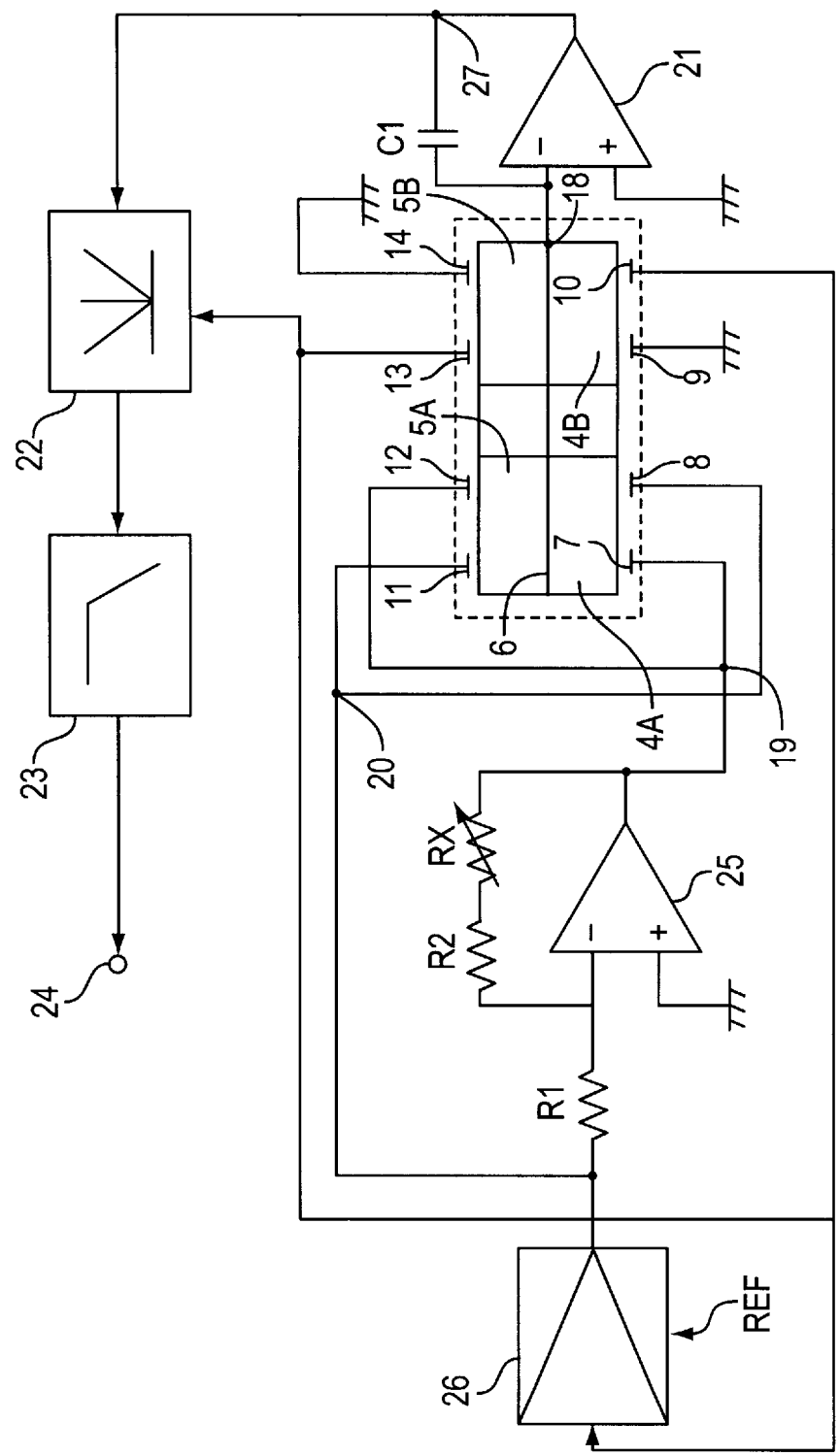
FIG. 3 is a circuit diagram of the angular velocity sensor of FIG. 1.

FIG. 3 shows the circuit diagram. The detection terminal 18 is connected to a reversal input terminal of a charge amplifier comprised of an amplifier 21 and a capacitor C1. An output terminal 27 of said charge amplifier is connected to a synchronous detection circuit 22, a filter 23, and ultimately to an output terminal 24. A reversal amplifier comprised of resistors R1,R2, a variable resistor Rx and an amplifier 25 is for forming the first and the second driving power sources 15,16. Numeral 26 represents an AGC amplifier for stabilizing the amplitude of tuning fork.

Figure 4:
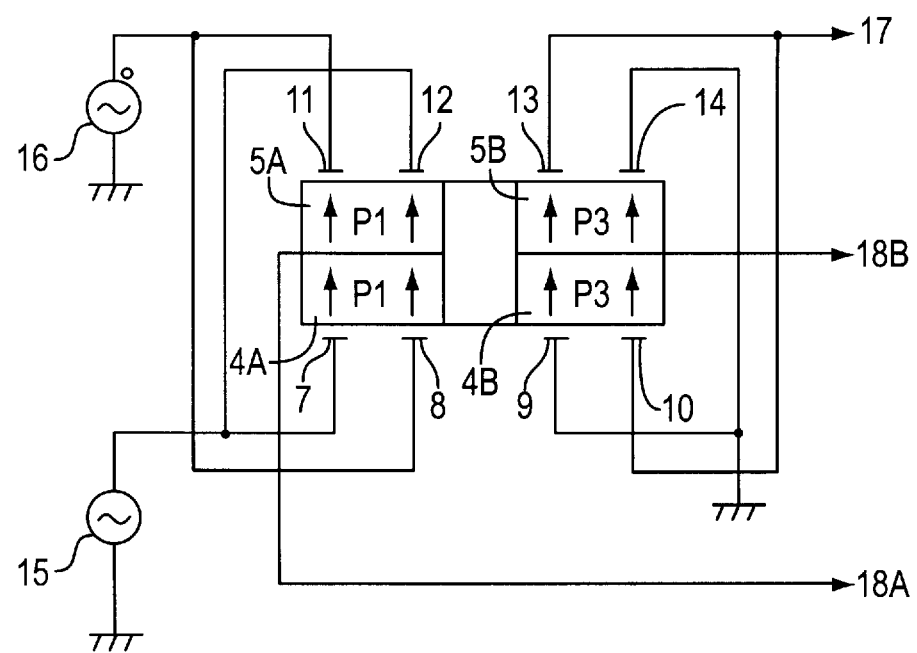
FIG. 4 is a conceptual chart showing the key portion of other example of the angular velocity sensor.

FIG. 4 shows another example of an angular velocity sensor according to the first embodiment of the present invention; where, the polarization direction P3 of tuning fork arm 4b,5b is changed to be the same as P1. In this case, the detection electrode is unable to pick up a sum of Coriolis signal components of tuning fork arms 4a,5a and 4b,5b, which was performed in the embodiment of FIG. 2. Therefore, each of Coriolis signals generated in detection electrodes 18a and 18b is picked up individually, and then added together after reversing a signal component of a Coriolis signal derived from either one of the tuning fork arms, to obtain a detection signal.

As described in the above, in an angular velocity sensor according to a first embodiment of the present invention, at least one of the tuning fork arms of U-shape first and second piezoelectric elements bonded together is polarized in a direction of thickness along which the piezoelectric elements are bonded, the first and the third driving electrodes disposed on a diagonal of tuning fork arm are supplied with a driving signal from a first driving power source while the second and the fourth driving electrodes are supplied with a driving signal from a second driving power source whose phase is inverse to that of the first driving power source. With the above constitution, the signal components for driving a tuning fork arm function to drive the tuning fork, but they cancel to each other, and the driving signal is never mixed in a detection signal to be detected by the detection electrode. As a result, the capability of detecting an angular velocity is improved to a higher accuracy level.

By making the polarization direction of the right and the left tuning fork arms opposite to each other, Coriolis forces derived from the right and the left arms assume the same phase as a signal on the detection electrode, and the summing is conducted on the detection electrode, resulting in the elimination of a summing circuit. Thus, the whole structure is remarkably simplified.

When the right and the left tuning fork arms are made to have a same direction of polarization, the signals generated in detection electrodes 18a and 18b may be picked up individually, and then these signal components may be added together after reversing a signal component derived from either one of the tuning fork arms, to an improved capability for detecting an angular velocity.

Furthermore, by polarizing only the portion corresponding to electrodes provided in the driving sector and the detection sector, noise components which appear due to unwanted vibration component while a tuning fork arm is at work can be significantly reduced.

Figure 5:
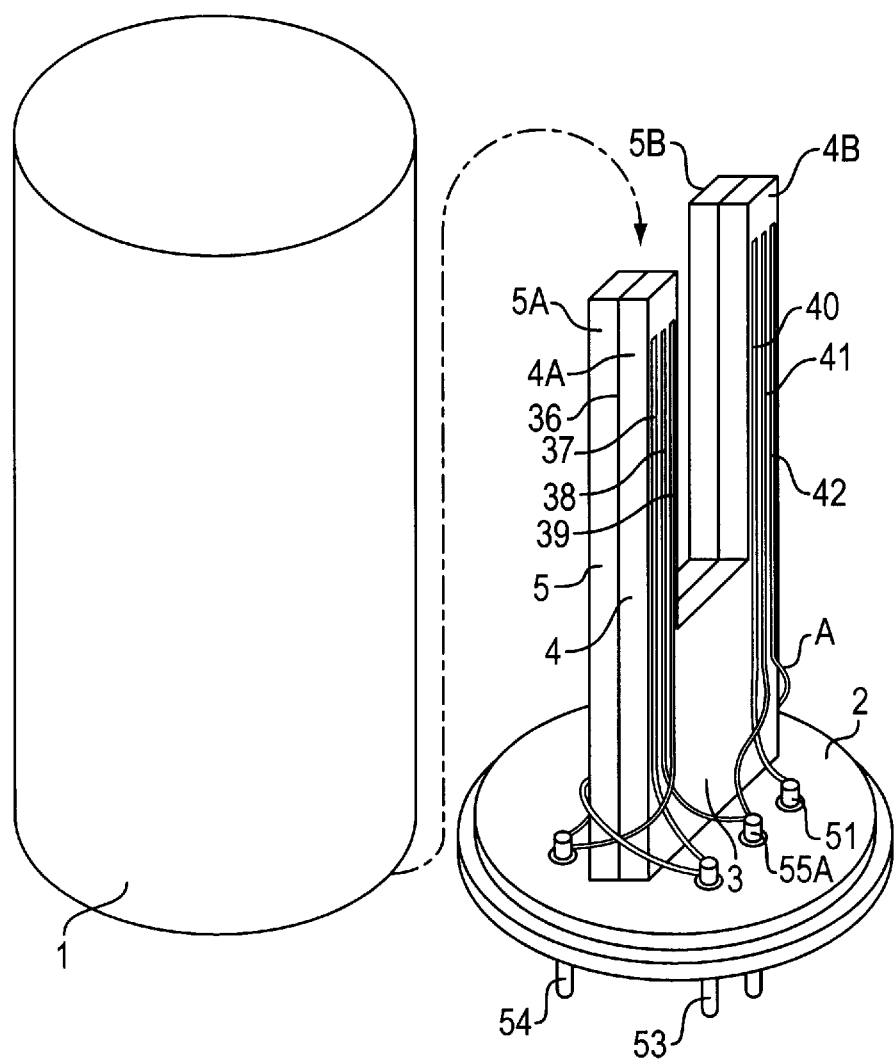
FIG. 5 is a perspective view showing an assembled angular sensor according to a second embodiment of the present invention.
Figure 6:
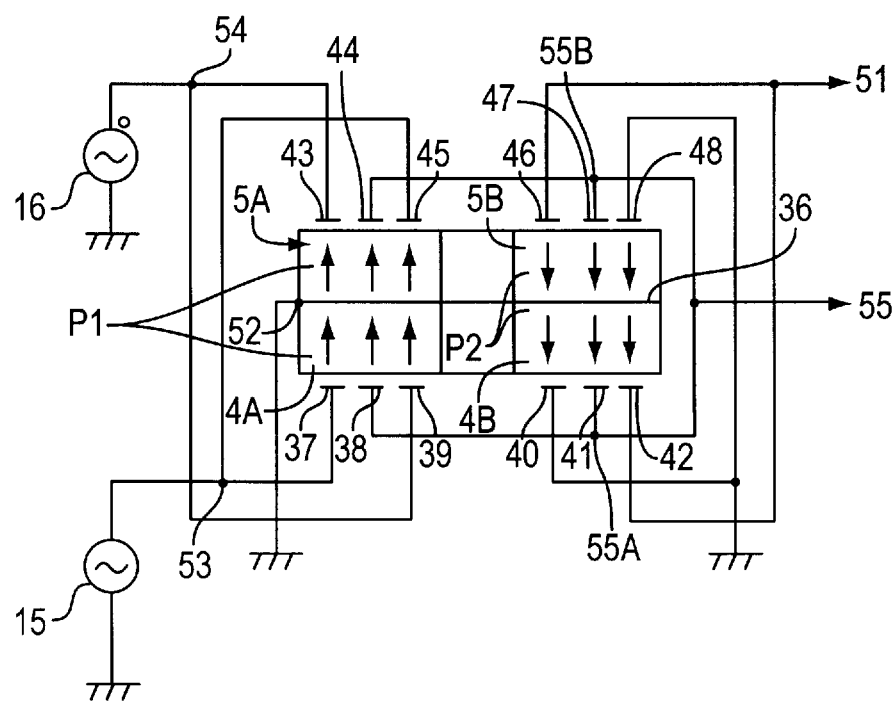
FIG. 6 is a conceptual chart showing the key portion of the angular velocity sensor of FIG. 5.
Figure 7:
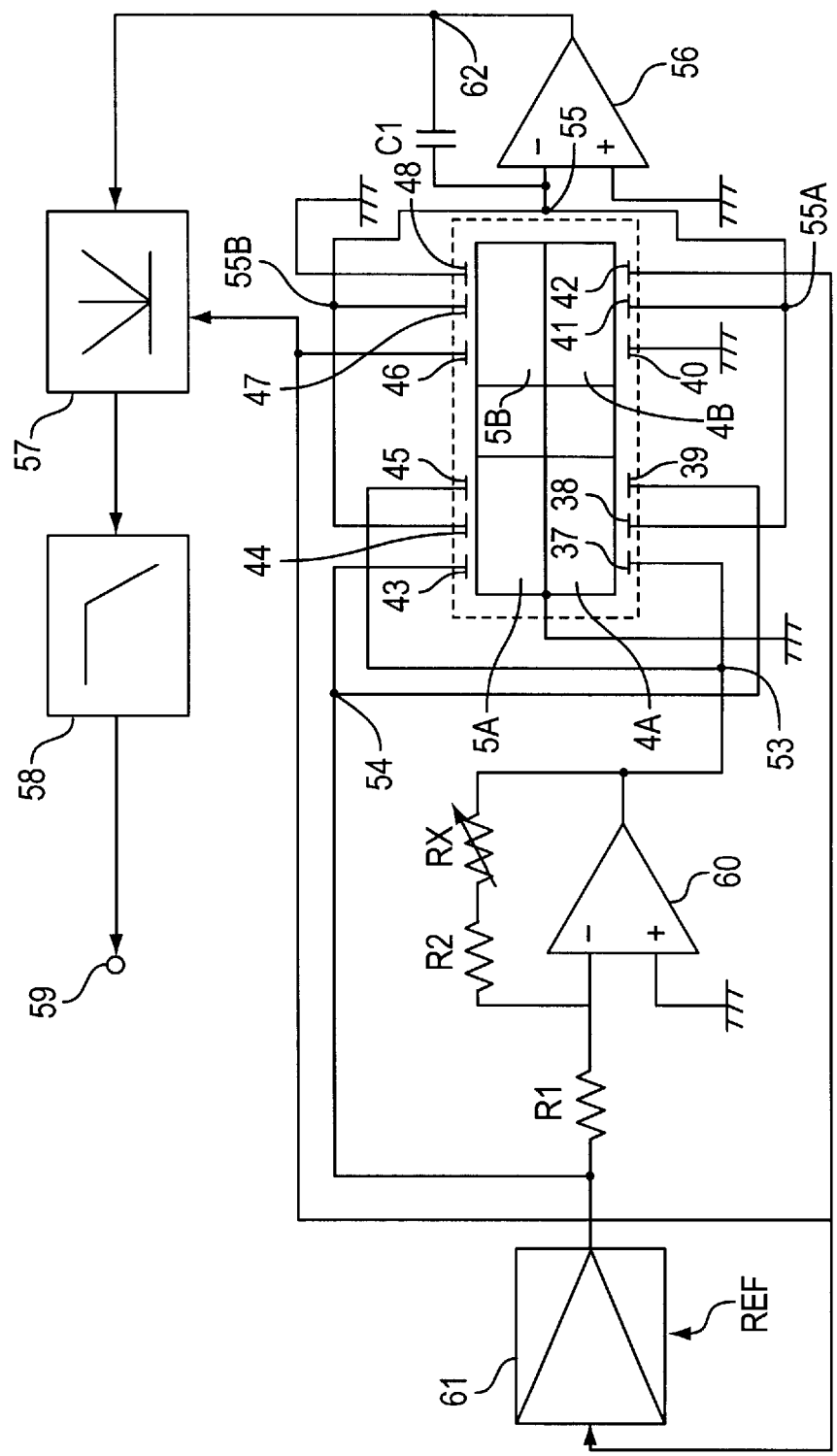
FIG. 7 is a circuit diagram of the angular velocity sensor of FIG. 5.

FIG. 5, FIG. 6 and FIG. 7 show an angular velocity sensor according to a second embodiment of the present invention. In FIG. 5, numeral 1 denotes an iron cap with the bottom open, nickel-plated on the surface, the bottom opening is fitted to a disk base 2 to form a sealed space within cap 1 housing an assembled angular velocity sensor. A detection element 3 is disposed within the sealed space without having contact with the inner surface of cap 1, the detection element being fixed on the base 2 with glue. Said detection element 3 is comprised of U-shape first and second piezoelectric elements 4,5 bonded together with a U-shape Ag—Pd intermediate electrode 36 in between, sintered to form a single body, as shown in FIG. 5. On the surface of tuning fork arms 4a,4b and 5a,5b of said first and second piezoelectric elements 4,5, oblong shaped Ag—Pd electrodes 37,38,39, 40,41,42,43,44,45,46,47 and 48 are provided respectively by printing/sintering. Among these electrodes, 37,39,43 and 45 being driving electrodes, 40,42,46 and 48 being monitor electrodes. As FIG. 6 shows, in a tuning fork arm 4a,5a of the bonded member, driving electrodes 37, 45 disposed on a diagonal across the intermediate electrode 36 are coupled with a first driving power source 15, while driving electrodes 39,43 disposed on another diagonal line crossing said diagonal are coupled with a second driving power source 16. Each of the first and second driving power sources 15, 16 supplies AC signal (tuning fork resonance frequency) to the pair of driving electrodes 37,45 and the other pair of driving electrodes 39,43, respectively, to make the tuning fork resonate. The signals supplied from the first and the second driving power sources 15,16 are inverse-phased to each other.

In a tuning fork arm 4b,5b constituting the monitor side, monitor electrodes 40,48 disposed on a diagonal are grounded, while monitor electrodes 42,46 disposed on other diagonal line crossing said diagonal are connected to a monitor detection terminal 51. Intermediate electrode 36 is connected to a ground terminal 52. Detection electrodes 38,41 are connected to a detection terminal 55a, and detection electrodes 44,47 are connected to a detection terminal 55b. These electrical connections are shown in FIG. 5, where, 53,54 are power supply terminals connected by lead wires A. The lead wire A between ground terminal 52 and intermediate electrode 36 is connected to the intermediate electrode 36 at a location lower than the tuning fork arms 4a,4b,5a,5b.

With the above described constitution, the tuning fork arm 4a,5a is polarized for 3 kV/mm field intensity in the direction of thickness, while the tuning fork arm 4b,5b is polarized opposite in the direction of thickness for 3 kV/mm field intensity, as shown in in FIG. 6. The polarization directions are indicated with the symbols P1 and P2, respectively.

When driving electrodes 37,45,39 and 43 are supplied with signals from first and second driving power sources 15,16, the tuning fork arm 4a,5a vibrates sidewise to the polarization direction P1, the tuning fork arm 4b,5b resonates to make sidewise vibration to the polarization direction P2. Explaining more in detail, suppose the inner driving electrodes 39,45 of the tuning fork arm 4a,5a are supplied with signals of inverse phase, the driving electrode 39 is provided with a negative electric field while the driving electrode 45 is provided with a positive electric field; this means that both of the tuning fork arms 4a and 5a are provided with a negative electric field towards the bottom in FIG. 6, viz. opposite to the polarization direction P1, and the inner side of tuning fork 4a,5a arm shrinks. In the outer side of tuning fork arm 4a,5a, an electric field of the same direction as the polarization direction P1 is provided from the driving electrodes 37,43 causing an elongation. As the result, the tuning fork arm 4a,5a bends inward, viz. tilts towards the tuning fork arm 4b,5b. When, the tuning fork arm 4b,5b moves corresponding to the move of tuning fork arm 4a,5a and bends towards the tuning fork arm 4a,5a. At the next moment when the phase of signals supplied from the first and the second driving power sources 15,16 is reversed, the tuning fork arm 4a,5a and tuning fork arm 4b,5b are respectively bent outward. These actions are alternated and the U-shape vibration member makes a resonation vibration.

When an angular velocity is applied to the U-shape vibration member being in the resonance vibration the tuning fork arm 4a,5a and the tuning fork arm 4b,5b are bent by Coriolis force in the direction of thickness, and the extent of bend is picked up by detection electrodes 38,41,44,47 and detection terminal 55.

For example, referring to FIG. 6, when the tuning fork arm 4a,5a is bent in a direction where the lower surface of tuning fork arm 4a elongates while the upper surface of tuning fork arm 5a shrinks, the driving electrode 38 is elongated in a direction perpendicular to the polarization direction, to generate a positive electric charge; the detection electrode 44 shrinks in a direction perpendicular to the polarization direction, to generate a positive electric charge as well. When, a negative electric charge is generated in a portion of detection electrode 36 sandwiched by tuning fork arms 4a,5a, which is taken out from detection terminal 55. When an angular velocity of opposite direction is applied to, the driving electrode 44 of tuning fork arm 4a,5a elongates, while the detection electrode 38 shrinks; and a negative electric charge is taken out from detection terminal 55. By the same principle, a positive or a negative electric charge is generated also at the tuning fork arm 4b,5b to be taken out from detection terminal 55.

Signals for driving tuning fork arms 4a,5a,4b,5b are supplied to the tuning fork arms 4a,5a,4b,5b. However, their signal components cancel to each other. The driving signals are grounded through intermediate electrode 36, the detection sector being separated from the driving sector, therefore the driving signal is never mixed in the detection sector.

FIG. 7 shows the circuit diagram thereof. The detection terminal 55 is connected to a reversal input terminal of a charge amplifier comprised of an amplifier 56 and a capacitor C1. An output terminal 62 of said charge amplifier is connected to a synchronous detection circuit 57, a filter 58, and ultimately to an output terminal 59. An reversal amplifier comprised of resistors R1,R2, a variable resistor Rx and an amplifier 60 is for forming the first and the second driving power sources 15,16. Numeral 61 represents an AGC amplifier for stabilizing the amplitude of tuning fork.

Figure 8:
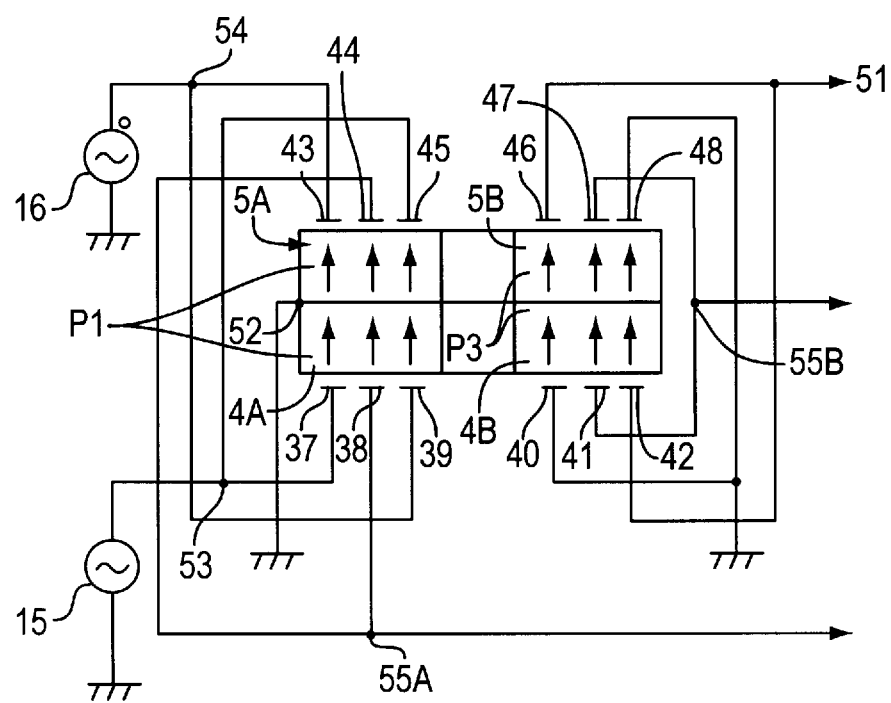
FIG. 8 is a conceptual chart showing the key portion of other example of the angular velocity sensor.

FIG. 8 shows another example of an angular velocity sensor according to the second embodiment of the present invention; where, the polarization direction P3 of tuning fork arm 4b,5b is changed to be the same as P1.

In this case, as Coriolis signal components of tuning fork arms 4a,5a and 4b,5b can not be picked up in sum, each of Coriolis signals generated in the right and the left tuning fork arms is picked up individually by detection electrodes 38,44 and detection electrodes 41,47. Namely, the sum of signal components 55a derived from detection electrodes 38,44 and the sum of signal components 55b derived from detection electrodes 41,47 are picked up separately, and then added together after reversing the signal component 55a derived from one of the tuning fork arms, to obtain a detection signal.

As described in the above, an angular velocity sensor according to the second embodiment of the present invention comprises U-shape first and second piezoelectric elements bonded together sandwiching an intermediate electrode, a first and a second driving electrodes and a first detection electrode provided on the surface of at least one of the tuning fork arms of the first piezoelectric element, and a third and a fourth driving electrodes and a second detection electrode provided on the surface of the tuning fork arm of second piezoelectric element; where, among the first, second, third and fourth driving electrodes, the first and the third driving electrodes disposed on a diagonal across the intermediate electrode are supplied with driving signal from the first driving power source, the second and the fourth driving electrodes disposed on a diagonal across the intermediate electrode are supplied with driving signal from the second driving power supply source the phase of which is inverse to that of the first driving power supply source, at least one of the tuning fork arms of U-shape first and second piezoelectric elements bonded together is polarized in a direction of thickness along which the piezoelectric elements are bonded. In the above described structure, although the signal components for driving a tuning fork arm function to drive the tuning fork they are never mixed in a detection signal, because the detection sector is completely separated from the driving sector. As a result, the capability of detecting angular velocity is improved to a higher accuracy.

By making the polarization direction of the right and the left tuning fork arms opposite to each other, Coriolis forces derived from the right and the left arms assume a same phase as a signal on the detection electrode, and the summing is conducted on the detection electrode resulting in the elimination of a summing circuit. Thus, the whole structure is remarkably simplified.

When the right and the left tuning fork arms are made to have a same direction of polarization, the signals generated in detection electrodes 38,44 and detection electrodes 41,47 may be picked up individually and then these signal components may be added together after reversing a signal component derived from either one of the tuning fork arms, to the improvement in the capability of detecting angular velocity.

Furthermore, by polarizing only the portion corresponding to electrodes provided in the driving sector and the detection sector, the noise components which appear due to unwanted vibration component when a tuning fork arm is at work can be significantly reduced.

INDUSTRIAL APPLICABILITY

In an angular velocity sensor according to the present invention, although the signal components for driving a tuning fork arm function to drive the tuning fork they are never mixed in a detection signal via the electrode, because the detection sector is completely separated from the driving sector. As a result, the capability of detecting angular velocity is improved to a higher accuracy.

We claim:

1. An angular velocity sensor comprising

U-shape first and second piezoelectric elements bonded together sandwiching a detection electrode, said first piezoelectric element having in at least one of the tuning fork arms a first and a second driving electrodes on a surface opposite to the detection electrode and said second piezoelectric element having in a tuning fork arm corresponding to the tuning fork arm on which said first and second driving electrodes are disposed a third and a fourth driving electrodes on a surface opposite to the detection electrode; wherein the first and the third driving electrodes, among said first through fourth driving electrodes, disposed in diagonal arrangement across the detection electrode, are coupled with a first driving power source, while the second and the fourth driving electrodes disposed in diagonal arrangement across the detection electrode are coupled with a second driving power source which supplies a signal whose phase is inverse to that of said first driving power source, and at least one of the tuning fork arms of said U-shape first and second piezoelectric elements is polarized in a direction of thickness along which the first and the second piezoelectric elements are bonded together.

2. The angular velocity sensor of claim 1, further comprising monitor electrodes of a same arrangement as the driving electrodes provided in the other tuning fork arm of the first and the second piezoelectric elements, wherein the right and the left tuning fork arms are polarized in a direction opposite to each other.

3. The angular velocity sensor of claim 2, wherein only a portion corresponding to the driving electrode and the monitor electrode is polarized.

4. The angular velocity sensor of claim 1, further comprising monitor electrodes of a same arrangement as the driving electrodes provided in the other tuning fork arm of the first and the second piezoelectric elements, wherein the right and the left tuning fork arms are polarized in a same direction.

5. The angular velocity sensor of claim 4, wherein only a portion corresponding to the driving electrode and the monitor electrode is polarized.

6. An angular velocity sensor comprising U-shape first and second piezoelectric elements bonded together sandwiching an intermediate electrode, said first piezoelectric element having in at least one of the tuning fork arms a first and a second driving electrodes and a first detection electrode on a surface opposite to the intermediate electrode and said second piezoelectric element having in a tuning fork arm corresponding to the tuning fork arm on which said first and second driving electrodes and first detection electrode are disposed a third and a fourth driving electrodes and a second detection electrode on a surface opposite to the intermediate electrode; wherein the first and the third driving electrodes, among said first, second, third and fourth driving electrodes, disposed in diagonal arrangement across the intermediate electrode, are coupled with a first driving power source, while the second and the fourth driving electrodes disposed in diagonal arrangement across the intermediate electrode are coupled with a second driving power source which supplies a signal whose phase is inverse to that of said first driving power source, and at least one of the tuning fork arms of said U-shape first and second piezoelectric elements is polarized in a direction of thickness along which the first and the second piezoelectric elements are bonded together.

7. The angular velocity sensor of claim 6, further comprising monitor electrodes and a detection electrode of a same arrangement as the driving electrodes and detection electrode on one tuning fork arm provided in the other tuning fork arm, wherein the right and the left tuning fork arms are polarized in a direction opposite to each other.

8. The angular velocity sensor of claim 7, wherein only a portion corresponding to the driving electrode, the detection electrode and the monitor electrode is polarized.

9. The angular velocity sensor of claim 6, further comprising monitor electrodes and a detection electrode of a same arrangement as the driving electrodes and detection electrode on one tuning fork arm provided in the other tuning fork arm of the first and the second piezoelectric elements, wherein the right and the left tuning fork arms are polarized in a same direction.

10. The angular velocity sensor of claim 9, wherein only a portion corresponding to the driving electrode, the detection electrode and the monitor electrode is polarized.

* * * * *

UNITED STATES PATENT AND TRADEMARK OFFICE
CERTIFICATE OF CORRECTION

PATENT NO. : 5,854,427
DATED      : December 29, 1998
INVENTOR(S): Jiro TERADA et al.

It is certified that error appears in the above-identified patent and that said Letters Patent is hereby corrected as shown below:

COVER PAGE,

[73] Assignee: delete "Industrical" and insert --Industrial--.

Signed and Sealed this

Twenty-fifth Day of May, 1999

Attest:

Q. TODD DICKINSON

*Attesting Officer*        *Acting Commissioner of Patents and Trademarks*